Mar. 13, 1923.
H. MOAKLEY
VARIABLE SPEED TRANSMISSION
Filed Dec. 21, 1917
1,448,490
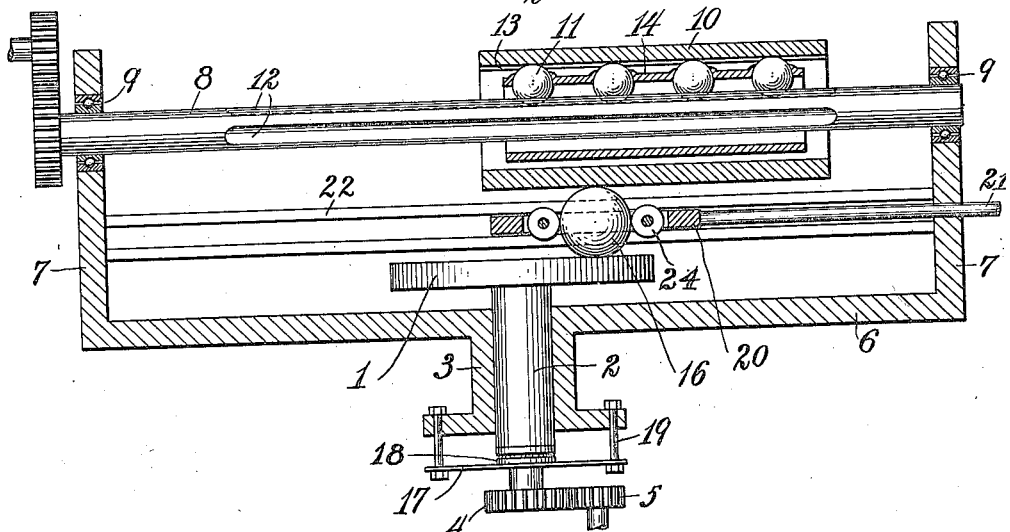
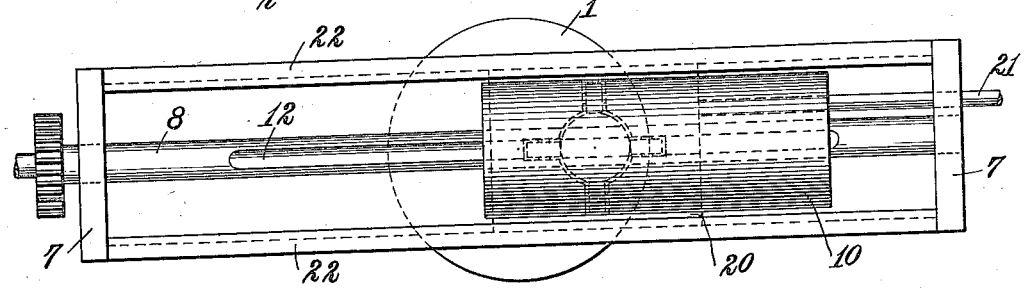
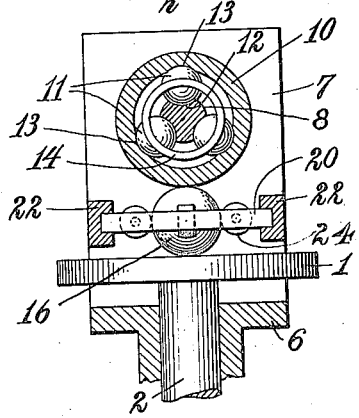
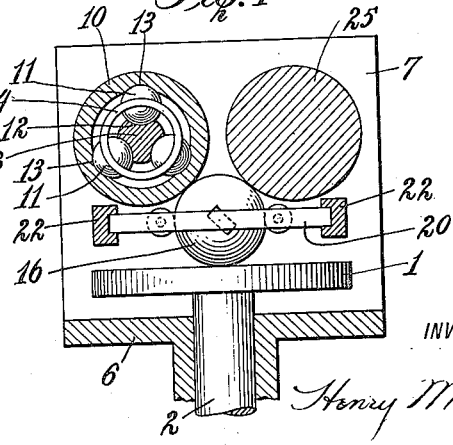
INVENTOR
Henry Moakley Patented Mar. 13, 1923.

1,448,490

UNITED STATES PATENT OFFICE.

HENRY MOAKLEY, OF NEW YORK, N. Y., ASSIGNOR TO HANNIBAL C. FORD, OF JAMAICA, NEW YORK.

VARIABLE-SPEED TRANSMISSION.

Application filed December 21, 1917. Serial No. 208,273.

*To all whom it may concern:*

Be it known that I, HENRY MOAKLEY, a citizen of the United States, residing at New York, in the county and State of New York, have invented new and useful Improvements in Variable-Speed Transmissions, of which the following is a specification.

This invention relates to variable speed transmissions and more particularly to the type of transmission consisting of a ball in rolling contact with two rotatable elements, one of which is a disc, a cone shaped roller or the like.

One of the objects of the invention is to provide a transmission of this character in which the ball may be bodily moved with respect to the elements to effect speed variations and yet the parts will remain in rolling contact without slipping.

Another object of the invention is to provide a transmission of the type referred to in which the ball may be bodily displaced with practically no effort and may also be accurately positioned to determine the speed ratio of the transmission.

Another object of the invention is to provide a transmission in which the ball may be in direct rolling contact with the driving and driven elements and yet permit the bodily displacement of the ball to effect changes in speed.

With these and other objects in view, the invention consists of the constructions and combinations which will be described in conjunction with the accompanying drawings and will be particularly pointed out in the appended claims.

In the drawings:

Figure 1 is a central vertical section through a transmission constructed in accordance with the principles of the invention.

Figure 2 is a plan view of Figure 1.

Figure 3 is a transverse section of Figure 1, and

Figure 4 is a transverse section through a modified construction.

The specific embodiments of the invention shown, are adapted for use where it is necessary to accurately transmit continuously varying speeds, as for example, in instruments of precision utilized for integrating one or two variable factors, but it is to be understood that the device may be used wherever variable speed transmissions requiring accuracy and ease of operation are desired, as will be obvious from the succeeding description.

In the form shown in Figures 1, 2 and 3 the driving element which is adapted to be driven at a constant speed or at a speed proportional to one factor which is to be integrated consists of a disc 1 mounted upon a shaft 2 which is mounted for rotation in a bearing 3. The end of the shaft 2 is of reduced diameter and carries a pinion 4 meshing with a pinion 5 by which it may be rotated although any other means for rotating the disc may be employed. The bearing 3 for the shaft constitutes a part of a frame 6 consisting of a base and two end plates 7. Mounted in the end plates 7 above the disc 1, is a shaft 8, which rotates freely upon ball bearings 9. A roller 10 surrounds the shaft and is rotatably connected thereto by balls or anti-friction elements 11 which roll in longitudinal grooves 12 in the shaft and also in corresponding longitudinal internal grooves 13 in the roller.

As is clear from Figure 3, three sets of balls or anti-friction elements are utilized which are spaced equidistantly around the shaft. A spacer 14 is interposed between the shaft and roller which comprises a sleeve having holes or openings therein to receive the balls. The walls of the openings for the balls are preferably countersunk as shown in Figure 1, which will cause the spacer to rest upon the balls and to be held out of contact with the shaft and roller. It will therefore be seen that the roller while connected to the shaft for rotation therewith can move freely along the shaft with little or no effort required to cause its displacement.

Mounted between the roller and disc is a ball 16 preferably of hard steel and it might here be stated that the working surfaces of the roller and disc should also be of hard steel or like material to minimize wear. As shown in Figure 1 the ball 16 contacts with the disc and roller at diametrically opposed points and is held in frictional engagement with these parts by a spring 17 which presses against a thrust bearing 18 carried by the shaft 2 to force the disc 1 upwardly. The spring 17 is carried by bolts 19 carried by the bearing 3 which may be adjusted to obtain the desired pressure between the parts. The ball 16 is carried in a slide 20 having rollers 24 bearing against the ball. The slide may be moved by a rod 21 or an equivalent device in slideways 22.

The operation of the transmission will be obvious from the preceding but will be briefly described. Assuming that the disc 1 is being rotated at a constant speed, the ball 16 will rotate and drive the roller 10 and shaft 8 at a speed proportional to the distance between the center of the disc and the point of contact with the ball. When it is desired to change the speed the rod 21 is actuated which will cause the ball 16 to be moved radially across the disc. During such radial movement the roller 10 will move linearly along the shaft 8 upon the balls 11, the roller remaining in rolling contact with the ball 16. It will therefore be seen that any desired speed of the roller and shaft 8 may be obtained and that the speed may be varied in a continuous manner. Moreover since the roller 10 is free to move linearly upon the shaft 8 on the ball bearings 11, little or no effort is required to move the ball 16, making the transmission particularly adaptable for instrument work.

In the modification disclosed in Figure 4, the disc 1, the roller 10 and ball 16 and associated parts are of the same construction as in Figure 3. However, instead of disposing the roller 10 so that it and the disc engage diametrically opposed points upon the ball, the roller 10 is offset and a second roller 25 is utilized, which consists preferably of a solid cylindrical roller mounted in a suitable bearing in the frame. This roller 25 and the disc 1 constitute the driving and driven members, and the roller 10 is only for the purpose of maintaining the ball 16 in frictional engagement with these parts by virtue of the spring acting upon the disc or by an equivalent structure.

This type of transmission may be operated similarly to the construction shown in Figure 3, the modified construction being best with heavier loads since the pressure of the ball 16 is distributed between two rollers. The roller 10 will therefore slide more freely upon the shaft 8 and there will be less tendency for the balls 11 to bind. For light loads as in instrument work the construction shown in Figure 3 is equally as good.

It is to be noted however, that in the construction shown in Figure 4, the points of contact between the disc and the ball and the roller 25 and the ball cannot be at diametrically opposed points, since, when the ball is bodily moved it must roll simultaneously on both of these surfaces and bodily displace the roller 10.

The important advantage of both forms of construction is that the ball by means of the cage 20 and rod 21 may be accurately positioned upon the disc 1. This is essential for the reason that the position of the ball upon the disc 1 determines the speed ratio.

What I claim is:

1. In a variable speed transmission an element rotatable about a fixed axis, a roller freely rotatable about a fixed axis and having a free bodily movement along said axis, a ball in rolling contact with said element and roller, means for imparting a pressure on said parts to maintain them in rolling contact, and a movable part mounted independently of said roller engaging said ball to roll it bodily over the surface of said element and to thereby cause it to bodily displace said roller.

2. In a variable speed transmission, two rotatable elements, a ball in rolling contact with said elements, means for applying a pressure to said parts to maintain them in rolling contact, a movable part mounted independently of said elements engaging said ball, and means for mounting one of said rotatable elements for free bodily movement whereby when said movable part is actuated to cause said ball to roll bodily on the surface of one element the other element is displaced bodily by the frictional engagement between it and the ball.

3. In a variable speed transmission an element rotatable about a fixed axis, a roller, a ball in rolling contact with said element and roller, means for applying pressure to said parts to maintain them in rolling contact, a movable part engaging said ball mounted independently of said element and roller and means for mounting said roller for free rotary and longitudinal movement whereby said ball remains in rolling contact with said roller and displaces it longitudinally when said part is actuated to cause said ball to roll bodily on the surface of said element.

4. In a variable speed transmission, two rotatable elements, a ball in rolling contact with said elements and adapted to be bodily displaced across the faces of both elements, said elements being fixed against bodily displacement with said ball, a bodily movable rotary member engaging said ball to maintain it in frictional engagement with said elements and means for applying a pressure on said parts to maintain them in frictional engagement.

5. In a variable speed transmission, two rotatable elements, a ball in rolling contact with said elements at non-diametrically opposed points and adapted to be displaced across the faces of both elements, said elements being fixed against a displacement with said ball and mechanical means permitting free bodily displacement of said ball, holding it in engagement with said elements and means for bodily displacing said ball.

6. In a variable speed transmission, two rotatable elements, a ball in rolling contact with said elements, a roller engaging said ball and holding it in frictional engagement with said elements and means for applying a pressure on said parts to maintain them in frictional engagement, said roller being bodily displaceable to permit free displacement of said ball.

7. In a variable speed transmission, a rotating element, a shaft, a roller surrounding said shaft, anti-friction members disposed between said shaft and roller connecting them for rotation but permitting a bodily linear movement of said roller upon said shaft, a ball in rolling contact with said element and roller, means for applying pressure to said parts to maintain them in frictional engagement whereby when said ball is bodily moved with respect to said element said roller will move along said shaft.

8. In a variable speed transmission, a shaft, a member surrounding said shaft, anti-friction members interposed between said shaft and member connecting them together for rotation and permitting linear movement of said member along said shaft, a ball in rolling contact with said member and operable to impart both of the specified forms of movement thereto, and a rotary element engaging said ball.

9. In a variable speed transmission, a shaft, a roller surrounding said shaft, said roller and shaft having linear grooves therein, anti-friction members extending into said grooves, a ball in rolling contact with said roller and adapted to rotate the same and also to move the same in the direction of its axis, and a rotary element engaging said ball.

10. In a variable speed transmission, a shaft, a member surrounding said shaft, anti-friction members interposed between said shaft and member and connecting them together for rotation but permitting linear movement of the member along the shaft, a ball in rolling contact with the member, a rotary element engaging said ball and means movable independently of the member for moving the ball with respect to the rotary element.

HENRY MOAKLEY.